March 26, 1940.  H. J. McDEVITT  2,194,607
CLEANING AND DRYING MECHANISM FOR AIR FILTERS
Filed May 5, 1938
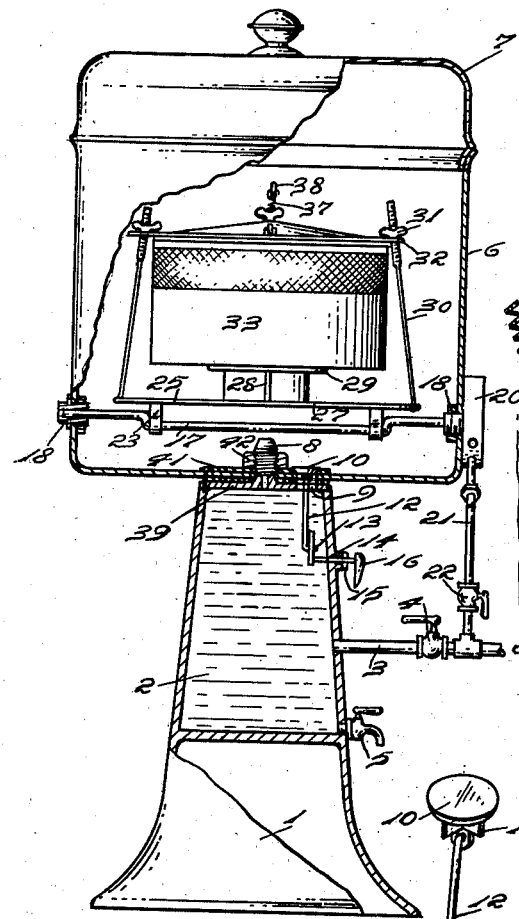
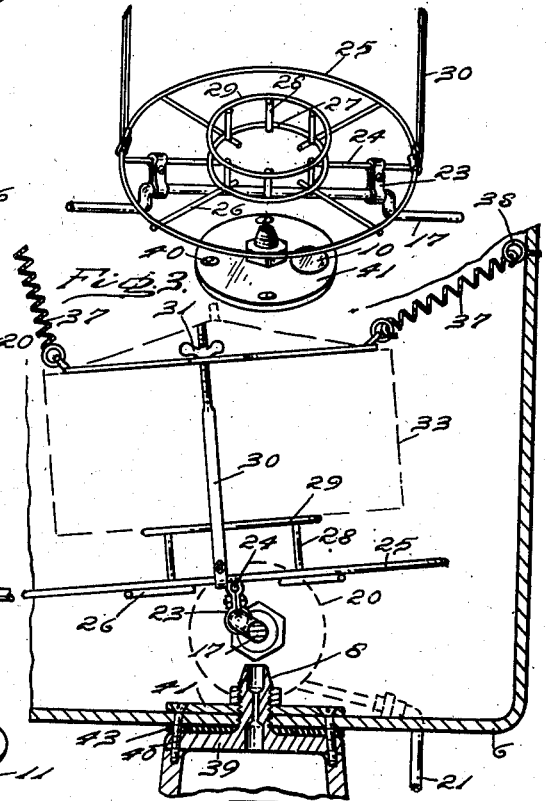
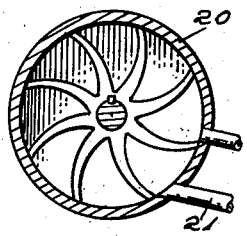
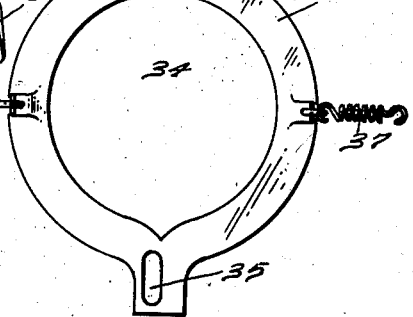
INVENTOR
Harry J. McDevitt
BY
Herbert S. Fairbanks
ATTORNEY Patented Mar. 26, 1940

2,194,607

UNITED STATES PATENT OFFICE 2,194,607

CLEANING AND DRYING MECHANISM FOR AIR FILTERS

Harry James McDevitt, Media, Pa., assignor to Gordon F. Milne, Rosemont, Pa.

Application May 5, 1938, Serial No. 206,309

3 Claims. (Cl. 259—1)

The object of this invention is to devise novel mechanism to effectively and quickly clean and dry filter units, such as are used for filtering the dirt and foreign impurities in the air passing to the carburetors of automobile engines.

A further object of the invention is to devise a simple and compact construction which will enable one to circulate a cleaning fluid through the air filter, and, after the cleaning operation has been completed, to mechanically agitate or shake the filter unit to effect the removal of the cleaning fluid which has been retained therein. The filtering medium employed is then oiled and the filter unit is ready for replacement on the engine.

A further object of the invention is to devise a construction in which the attendant after placing the filter unit in the cleaning and drying chamber can control the operations of cleaning and drying by controlling valves without removing the filter unit from the cleaning and drying chamber.

With the above and other objects in view as will hereinafter clearly appear, my invention comprehends a novel cleaning and drying mechanism for air filters.

It further comprehends a novel device of the character described, wherein a novel construction and arrangement of cleaning mechanism is employed, and wherein a novel construction and arrangement of drying mechanism is employed.

Other novel features of construction and advantage will hereinafter more clearly appear in the detailed description and the appended claims.

For the purpose of illustrating the invention, I have shown in the accompanying drawing typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a sectional elevation of a cleaning and drying mechanism, embodying my invention.

Figure 2 is a perspective view showing a portion of the filter unit support and its adjuncts.

Figure 3 is an enlarged detail showing more particularly the drying mechanism.

Figure 4 is a detail of a valve and its operating means.

Figure 5 is a top plan view of a locking member for the filter unit.

Figure 6 is a sectional view of a fluid pressure motor.

Figure 7 is a detail of another embodiment of the invention.

Similar numerals indicate corresponding parts.

Referring to the drawing:

1 designates the base of a filtering unit cleaner, embodying my invention. The base, as illustrated, is in the form of a chambered standard having at its upper end a chamber 2 to receive the cleaning liquid, such as for example kerosene or gasolene. A pipe 3 having a controlling valve 4, leads from a source of compressed air supply (not shown), and discharges into the chamber 2 preferably a desired distance above the bottom thereof. 5 is a controllable drain from the chamber 2.

The upper end of the chamber 2 is closed and forms a seat for the bottom of a tank 6 having a removable cover 7. The tank has a nozzle 8 communicating with the chamber 2 and terminating a desired distance above the bottom of the tank. The bottom of the tank and the top of the standard have a drainage opening 9 controlled by a valve 10 having guide vanes 11 and a depending stem 12, pivoted thereon, and deflected at its lower end and connected with a link 13 on a rock shaft 14, which passes through a stuffing box 15 and is provided with a handle 16.

A crank 17 extends into the tank and is mounted in journals 18, one of which serves as a stuffing box. The crank may be manually actuated by a handle 19, see Figure 7, or it may be mechanically driven as shown in Figure 1, and as will now be described.

The crank 17 is driven by a motor 20, of any desired or conventional type, and is preferably driven by compressed air introduced through a pipe 21 leading from the pipe 3 and provided with a manually actuated controlling valve 22. The crank arms are connected by rods 23 with a cross member 24 of the unit support comprising a ring 25 connected with the cross member 24 and having inwardly extending rods 26 secured at their inner ends to a lower ring 27 connected by rods 28 with an upper ring 29 of such size as to receive filtering units of different sizes.

The ring 25 has upwardly extending rods 30 threaded at their upper end to receive thumb nuts 31 which cause a locking member 32 to press against the top of a filter unit 33 and secure it in position. The locking member 32 has an opening 34 and one end has a slot 35, while the other end is apertured as at 36. In this manner the tubular coupling sleeve of the filter unit is positioned directly above the nozzle 8.

The member 32 has springs 37 connected with it and detachably connected with rings 38 secured to the wall of the tank 6.

The standard 1 may be in the form of a casting having a cover 39 provided with the nozzle 8 and secured in place by bolts 40. A washer 41 is pressed against the bottom of the tank by a nut 42 in threaded engagement with the nozzle. 43 is a sealing gasket.

The operation will now be apparent to those skilled in this art and is as follows:

The filter unit 33 is placed on its support, the locking member positioned over it with the rods passing through the locking member and the thumb nuts 31 are tightened. The manner in which the springs 37 are applied will be clear from the drawing.

Assuming now that the cleaning fluid is in the chamber 2, the valve 4 is opened and compressed air enters the chamber 2 to force the cleaning fluid through the nozzle 8 into the filter unit. When the cleaning operation is completed, the valve 10 is opened to permit the cleaning fluid to pass from the tank 6 to the chamber 2.

With the valve 4 closed, the valve 22 is opened and fluid under pressure passes to the motor 20 to cause it to revolve, thereby revolving the crank 17. This causes a shaking or agitation of the filter unit support and the filter unit thereon to effect the removal of cleaning fluid in the filter unit. The springs 37, if employed, prevent the filter unit from striking against the inner wall of the tank 6.

If desired, the filter unit can be agitated at the same time the cleaning fluid is injected into it by the nozzle, but in practice, I prefer to first clean the filter unit, and then subject it to a shaking operation to effect the drying.

The filter unit is now ready to be removed, oiled and replaced on the engine.

The crank 17 may be turned by hand if desired.

If the filter unit is not dried before oiling, the oil is diluted by the cleaning fluid on the filtering material and the walls and baffles of the filter and the efficiency of the filter in removing impurities from the air is materially reduced.

The felt pad of the conventional filter unit is preferably removed before the cleaning operation, and after the cleaning operation is completed the felt pad is oiled and replaced.

Having thus described my invention, what I claim as new and desire to secure by Letters Patent is:

1. In a cleaning and drying mechanism for air filters, a tank having a removable cover to provide for the insertion of an air filter, a crank within the tank and journalled in the walls of the tank near the bottom thereof, a skeleton support connected with said crank and having centrally disposed, upwardly extending centering means for the air filter, and having upwardly extending rods, a ring like member to seat on the top of the air filter, means to secure said rods to said member, and means to revolve said crank.

2. In a cleaning and drying mechanism for air filters, a tank having a removable cover to provide for the insertion of an air filter, a crank within the tank and journalled in the walls of the tank near the bottom thereof, a skeleton support connected with said crank and having centrally disposed, upwardly extending centering means for the air filter, and having upwardly extending rods, a ring like member to seat on the top of the air filter, means to secure said rods to said member, springs secured at one end to said member and at their opposite ends to the wall of the tank, and means to revolve said crank.

3. In a cleaning and drying mechanism for air filters, a tank having a removable cover to provide for insertion of an air filter, a crank journalled in the walls of the tank, a skeleton support for the air filter connected with said crank, having centrally located centering means for an air filter, rods extending upwardly from said support and threaded at their upper ends, a ring like clamping member having an aperture at one side and a slot at the opposite side to receive said rods, thumb nuts in threaded engagement with said rods outwardly of said member, and means to revolve said crank.

HARRY JAMES McDEVITT.